United States Patent [19]
Zai et al.

[11] Patent Number: 6,122,329
[45] Date of Patent: *Sep. 19, 2000

[54] RADIO FREQUENCY IDENTIFICATION INTERROGATOR SIGNAL PROCESSING SYSTEM FOR READING MOVING TRANSPONDERS

[75] Inventors: Li-Cheng Zai, San Jose, Calif.; Trieu C. Chieu, Scarsdale, N.Y.

[73] Assignee: Intermec IP Corp., Woodland Hills, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/153,617

[22] Filed: Sep. 15, 1998

Related U.S. Application Data
[60] Provisional application No. 60/073,933, Feb. 6, 1998.

[51] Int. Cl.[7] .............................. H04B 15/00; H03D 3/22; G01S 13/74
[52] U.S. Cl. .............................. 375/329; 375/130; 342/42
[58] Field of Search .............................. 375/329, 322, 375/224, 326, 279, 308; 342/42, 51; 455/41, 45, 46, 517; 329/304, 310; 325/130

[56] References Cited

U.S. PATENT DOCUMENTS

| | | | |
|---|---|---|---|
| 4,041,490 | 8/1977 | Watt | 343/17 |
| 4,888,591 | 12/1989 | Landt et al. | 342/44 |
| 5,349,332 | 9/1994 | Ferguson et al. | 340/572.2 |
| 5,477,225 | 12/1995 | Young et al. | 342/46 |
| 5,510,795 | 4/1996 | Koelle | 342/114 |
| 5,617,060 | 4/1997 | Wilson et al. | 330/129 |
| 5,649,296 | 7/1997 | MacLellan et al. | 455/38.2 |
| 5,777,561 | 7/1998 | Chieu et al. | 340/825.54 |
| 5,784,686 | 7/1998 | Wu et al. | 455/45 |
| 5,842,118 | 11/1998 | Wood, Jr. | 455/101 |

OTHER PUBLICATIONS

Greef, Roy "Method of communications in a backscatter system interrogator, and backscatter communications system" WO 99/60511. pp. 1–14, Nov. 1999.

"SA 17.5: A Low–Power CMOS Integrated Circuit For Field–Powered Radio Frequency Identification Tags" by Friedman et al., 1997 IEEE International Solid State Circuits Conference, Feb. 8, 1997.

*Primary Examiner*—Chi H. Pham
*Assistant Examiner*—Khai Tran
*Attorney, Agent, or Firm*—O'Melveny & Myers LLP

[57] ABSTRACT

An RF/ID interrogator recovers a backscattered data signal from a moving RF/ID transponder by combining the received in-phase (I) and quadrature-phase (Q) components of the signal in a manner that cancels out the amplitude nulls and phase reversals caused by movement of the RF/ID transponder. More particularly, the RF/ID interrogator comprises a radio having a transmitter portion to provide an RF carrier signal and a receiver portion to receive the I and Q signals from the RF transponder. A bandpass filter is coupled to the radio to remove direct current (DC) components from the I and Q. A processor coupled to the radio and the filter executes stored instructions to combine the filtered I and Q signals and recover the original backscattered data signal therefrom. In an embodiment of the invention, the processor estimates a phase angle $\beta(t)$ between the I and Q signals and the RF carrier by calculating an arctangent of a ratio of the filtered Q and I signals. Thereafter, the processor recovers the backscattered data signal by summing a product of the filtered I signal and the cosine of the estimated phase angle $\beta(t)$ with a product of the filtered Q signal and the sine of the estimated phase angle $\beta(t)$.

25 Claims, 3 Drawing Sheets

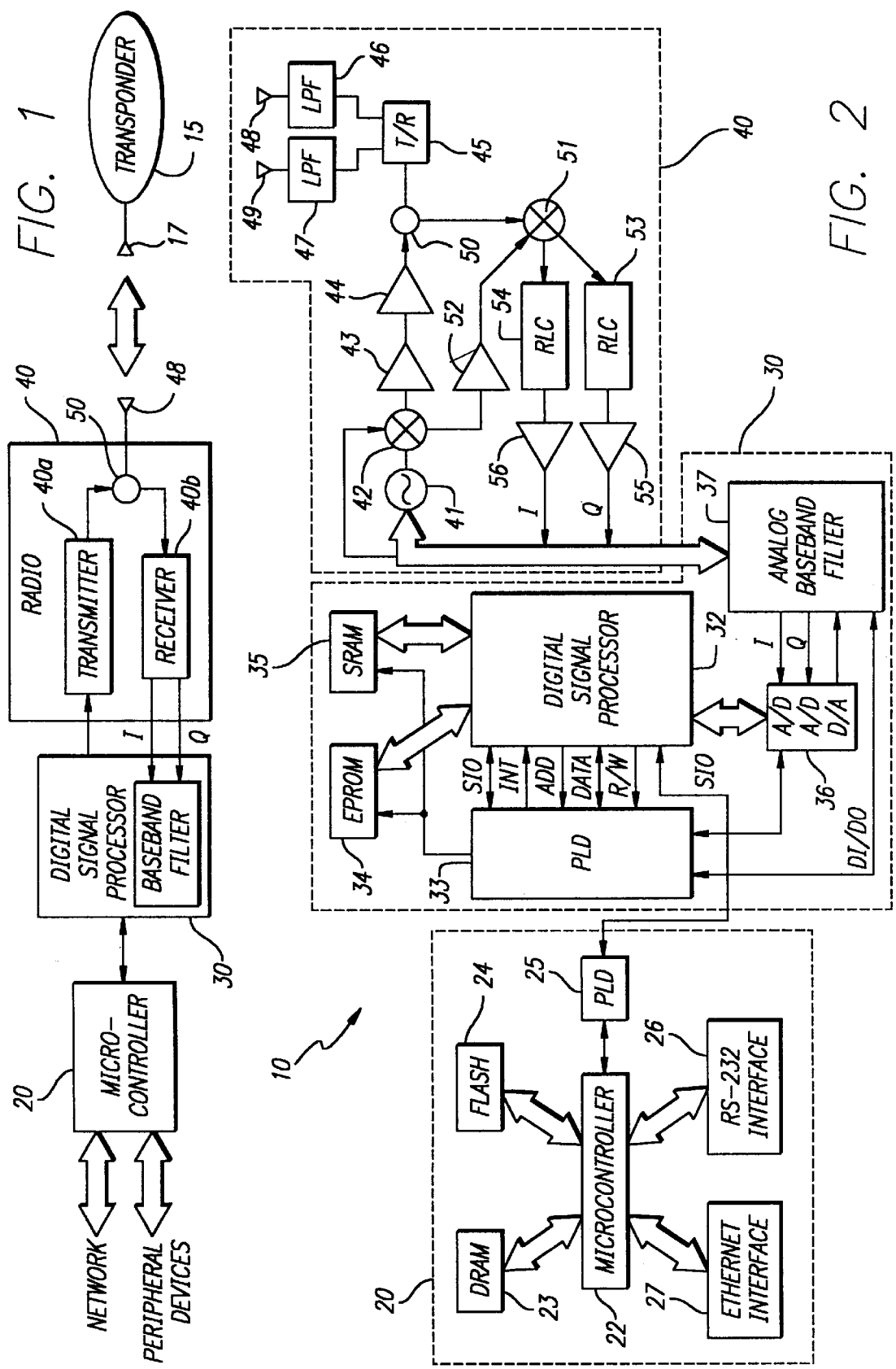

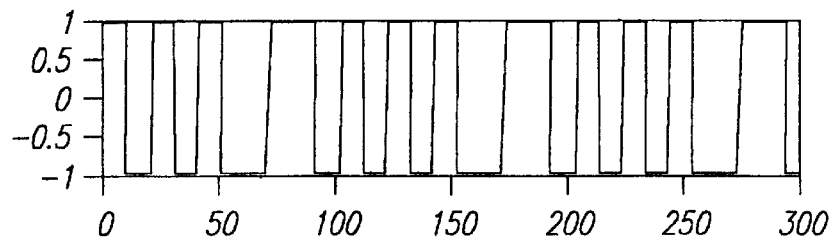
FIG. 3A
FIG. 3B
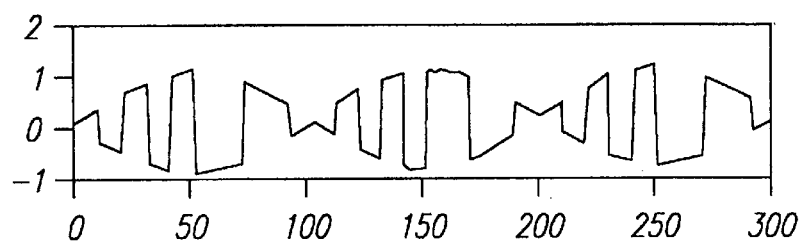
FIG. 3C
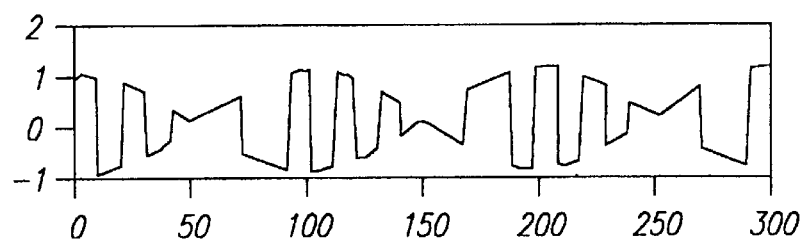
FIG. 3D
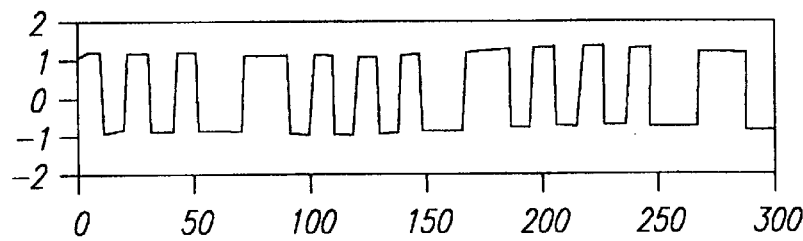

RADIO FREQUENCY IDENTIFICATION INTERROGATOR SIGNAL PROCESSING SYSTEM FOR READING MOVING TRANSPONDERS

CROSS-REFERENCE TO RELATED APPLICATION

This application claims the benefit of U.S. Provisional Application Serial No. 60/073,933, filed Feb. 6, 1998, which application is specifically incorporated herein, in its entirety, by reference.

BACKGROUND OF THE INVENTION

1. Field of the Invention

The invention relates to radio frequency identification (RF/ID) interrogators and transponders, and more particularly, to an RF/ID interrogator that can recover data from moving RF/ID transponders.

2. Description of Related Art

In the automatic identification industry, the use of RF/ID transponders (also known as RF/ID tags) has grown in prominence as a way to track data regarding an object to which the RF/ID transponder is affixed. An RF/ID transponder generally includes a semiconductor memory in which digital information may be stored, such as an electrically erasable, programmable read-only memory (EEPROMs) or similar electronic device. Under a technique referred to as "backscatter modulation," the RF/ID transponders transmit stored data by reflecting varying amounts of an electromagnetic field provided by an RF/ID interrogator by modifying their antenna matching impedances. The RF/ID transponders can therefore operate independent of the frequency of the energizing field, and as a result, the interrogator may operate at multiple frequencies so as to avoid radio frequency (RF) interference, such as utilizing frequency hopping spread spectrum modulation techniques. The RF/ID transponders may either be passive, in which they extract their power from the electromagnetic field provided by the interrogator, or active, in which they include their own power source.

Since RF/ID transponders do not include a radio transceiver, they can be manufactured in very small, light weight and inexpensive units. Passive RF/ID transponders are particularly cost effective since they lack a power source. In view of these advantages, RF/ID transponders can be used in many types of applications in which it is desirable to track information regarding a moving or inaccessible object. One such application is to affix RF/ID transponders to work pieces moving along a conveyor belt of an assembly line. The RF/ID transponders would contain stored information regarding the particular assembly requirements for the work piece to enable automated equipment to operate on the work piece and perform certain tasks unique to the work piece requirements. This way, products having different assembly requirements can be sent down the same assembly line without having to modify the assembly line for each unique requirement. Another application for RF/ID systems is to collect information from a moving motor vehicle, such as for vehicle toll collection.

A drawback of conventional RF/ID systems is that it is difficult for the interrogator to accurately recover the information stored in the transponder when the transponder is moved relative to the interrogator. The signals received by the interrogator exhibit amplitude nulls and phase reversal when the round-trip transmission path delay (i.e., phase delay) between the interrogator and the transponder changes by more than one-quarter wavelength (80/4). With a carrier frequency of 2.4 GHz, 80/4 would be equal to 3 centimeters (cm). It takes roughly 2 milliseconds (msec) to transmit a typical data packet at a rate of 40 kilobits per second (kpbs)). Thus, an RF/ID transponder moving at a rate of about 1,500 cm/sec, or 34 miles per hour (corresponding to 3 cm in 2 msec), relative to the interrogator, would likely exhibit undesirable amplitude nulls and phase reversals. Such a rate of speed would be expected in many RF/ID applications, and the amplitude nulls and phase reversals are further exacerbated at higher speeds. The amplitude nulls and phase reversals tend to mask actual data, making data recovery very difficult. As a result, RF/ID systems are not sufficiently reliable in recovering data under conditions in which the transponder is moving very quickly, such as the moving conveyor belt and motor vehicle applications discussed above.

Thus, it would be very desirable to provide an RF/ID interrogator having a capability of recovering data from a moving RF/ID transponder.

SUMMARY OF THE INVENTION

In accordance with the teachings of the present invention, an RF/ID interrogator is provided for recovering a backscattered data signal from a moving RF/ID transponder. The interrogator recovers the backscattered data signal by combining the received in-phase (I) and quadrature-phase (Q) components of the signal in a manner that cancels out the amplitude nulls and phase reversals caused by movement of the RF/ID transponder.

More particularly, the RF/ID interrogator comprises a radio having a transmitter portion to provide an RF carrier signal and a receiver portion to receive the I and Q signals from the RF transponder. A bandpass filter is coupled to the radio to remove direct current (DC) components from the received I and Q signals. A processor coupled to the radio and the bandpass filter executes stored instructions to combine the I and Q signals to recover information from the backscattered data signal. Specifically, the processor recovers the backscattered data signal by summing a product of the filtered I signal and the cosine of an estimated value of the phase angle $\beta(t)$ with a product of the filtered Q signal and the sine of the estimated phase angle $\beta(t)$. The phase angle $\beta(t)$ represents the phase difference between the I and Q signals and the RF carrier signal transmitted by the radio.

In an embodiment of the invention, the processor selects one of first and fourth quadrants of a phase plane for the estimated phase angle $\beta(t)$ depending upon the relative signs of the I and Q signals. The recovered backscattered data signal is compared with a predefined data sequence, such as a preamble of a received data packet from the transponder. The selected one of the first and fourth quadrants is accurate if the backscattered data signal matches the predefined data sequence or the ones complement of the predefined data sequence, and further recovery of the backscattered signal is continued. The phase angle $\beta(t)$ may be estimated from the arctangent of the ratio of the Q and I signals, or may be known in advance or derived from historical data.

A more complete understanding of the RF/ID interrogator signal processing system for reading moving transponders will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 1 is a block diagram illustrating an RF/ID interrogator and transponder;

FIG. 2 is an embodiment of the RF/ID interrogator of FIG. 1;

FIGS. 3A–3D are graphs illustrating the transponder signal at various stages of processing by the interrogator.

DETAILED DESCRIPTION OF THE PREFERRED EMBODIMENT

Figure 4:
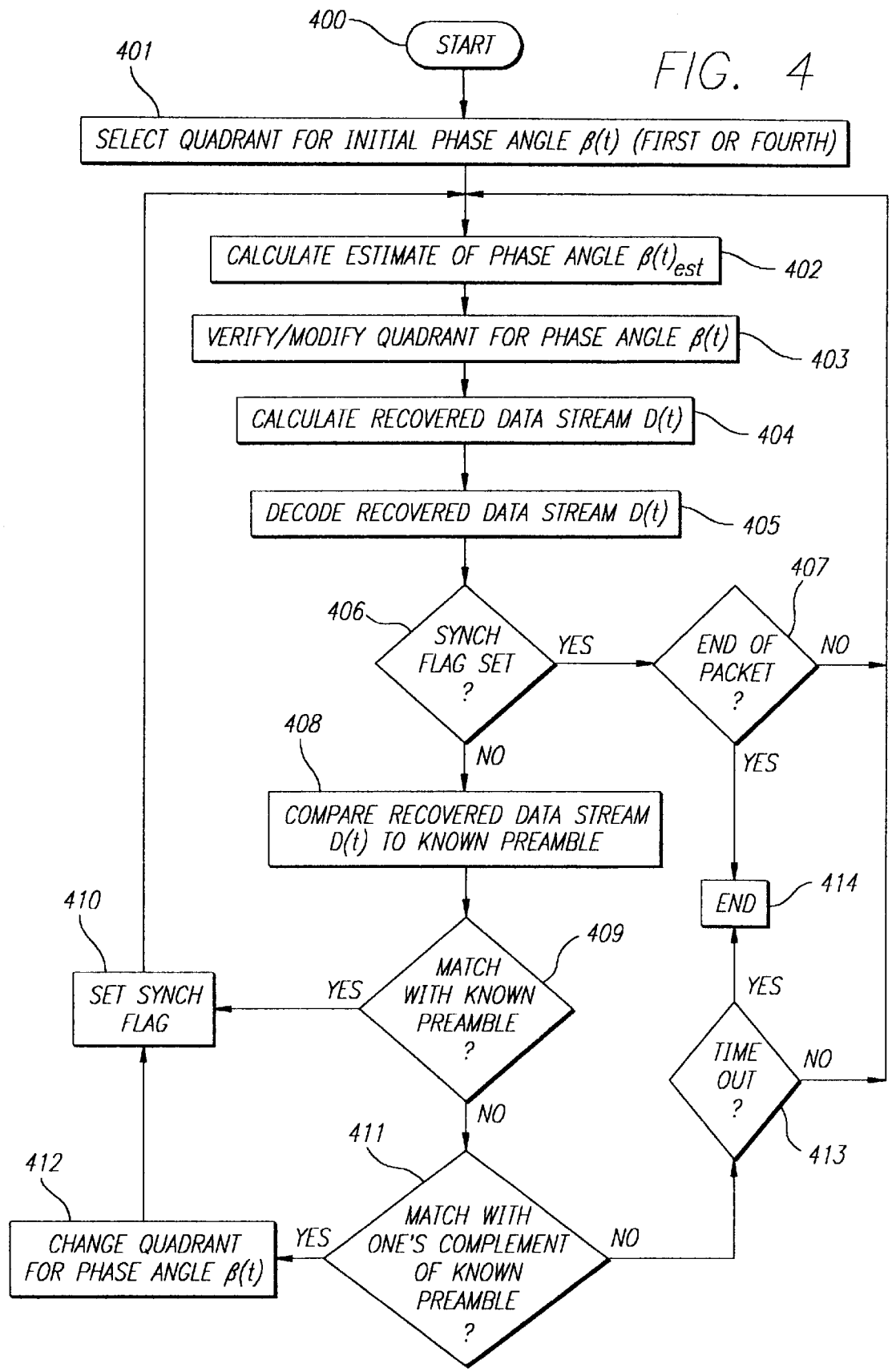
FIG. 4 is a flow chart illustrating the steps for processing the transponder signal.

The present invention satisfies the need for an RF/ID interrogator having a capability of recovering data from a moving RF/ID transponder. In the detailed description that follows, like element numerals are used to describe like elements illustrated in one or more of the figures.

Referring first to FIG. 1, an RF/ID interrogator 10 and transponder 15 in accordance with the present invention are illustrated. The interrogator 10 comprises a microcontroller module 20, a digital signal processor (DSP) module 30, and a radio module 40. The microcontroller module 20 provides control over high level operation of the interrogator 10 and communicates with an external network and peripheral devices. The DSP module 30 provides direct control over all operations of the radio module 30 in response to high level commands provided by the microcontroller module 20. The radio module 30 provides for RF communications to/from the transponder 15. The transponder 15 is disposed in proximity to the interrogator 10, and has an antenna 17 that radiates an RF backscattered signal in response to an RF transmission signal provided by the interrogator. The transponder 15 may either be passive, whereby it receives its power from the modulated electromagnetic field provided by the interrogator 10, or active, whereby it contains its own internal power source, such as a battery.

More particularly, the radio module 40 further comprises a transmitter portion 40a, a receiver portion 40b, a hybrid 50 and an antenna 48. The hybrid 50 may further comprise a circulator. The transmitter portion 40a includes a local oscillator that generates an RF carrier frequency. The transmitter portion 40a sends a transmission signal modulated by the RF carrier frequency to the hybrid 50, which in turn passes the signal to the antenna 48. The antenna 48 broadcasts the modulated signal and captures signals radiated by the tag 15. The antenna 48 then passes the captured signals back to the hybrid 50, which forwards the signals to the receiver portion 40b. The receiver portion 40b mixes the captured signals with the RF carrier frequency generated by the local oscillator to directly downconvert the captured signals to a baseband information signal. The baseband information signal comprises two components in quadrature, referred to as the I (in phase with the transmitted carrier) and the Q (quadrature, 90 degrees out of phase with the carrier) signals. The hybrid 50 connects the transmitter 40a and receiver 40b portions to the antenna 48 while isolating them from each other. In particular, the hybrid 50 allows the antenna 48 to send out a strong signal from the transmitter portion 40a while simultaneously receiving a weak backscattered signal reflected from the transponder 15.

The I and Q signals received by the receiver portion 40b have a large DC component that results from the demodulation of the signals. Since the DC component is undesirable, the DSP module 30 includes bandpass filters and gain stages to remove the DC component from the I and Q signals. As a result, the filtered I and Q signals become bipolar and exhibit nulls and phase reversal when the phase delay between the interrogator 10 and the transponder 15 changes by more than one-quarter wavelength (80/4). In other words, movement of the transponder 15 relative to the interrogator 10 while data signals are being received can cause the received signals to be out of phase with respect to the transmitted signal, resulting in partial cancellation of the data signals. In the present invention, the DSP module 30 executes an algorithm that combines the filtered I and Q signals in a manner which eliminates the phase delay dependence, thus enabling the accurate recovery of the information signals from the transponder 15.

The I and Q signals received by the radio module 40 may be described according to the following Equations 1 and 2:

$$I(t)=[A\cos(wt-\alpha_1)+B\cos(wt-\alpha_2)+(C+d(t))\cos(wt-\beta(t))]\cos(wt)$$

$$Q(t)=[A\cos(wt-\alpha_1)+B\cos(wt-\alpha_2)+(C+d(t))\cos(wt-\beta(t))]\sin(wt)$$

wherein, A is the signal amplitude caused by leakage RF power from the transmitter, B is the signal amplitude reflected from the antenna, and C is the signal amplitude backscattered from the transponder 15; $\alpha_1$, $\alpha_2$, and $\beta(t)$ are phase differences between the aforementioned signal amplitudes A, B and C, and the local oscillator, respectively; d(t) is the modulated signal component from the transponder 15 and either has a positive voltage (+V) or a negative voltage (−V) corresponding to a data bit of ONE or ZERO, respectively; and, w is the carrier frequency of the local oscillator.

More specifically, the phase difference $\beta(t)$ is defined according to the following Equation 3:

$$\beta(t) = \frac{4\pi x(t)}{\lambda} + \alpha_3$$

wherein, $\lambda$ is the wavelength; x(t) is the distance between the interrogator 10 and the transponder 15; and $\alpha_3$ is the fixed component of the phase difference of the backscattered signal. After passing through the bandpass filters, the I and Q signals can be described according to the following Equations 4 and 5:

$$(I(t))_{bandpass} = \frac{d(t)\cos(\beta(t))}{2}$$

$$(Q(t))_{bandpass} = \frac{d(t)\sin(\beta(t))}{2}$$

A ratio of the filtered I and Q signals thereby yields an estimate of the phase difference $\beta(t)_{est}$ between the backscattered signal and the local oscillator according to the following Equation 6:

$$(\beta(t))_{est} = \tan^{-1}\frac{(Q(t))_{bandpass}}{(I(t))_{bandpass}}$$

Alternatively, the estimated phase difference $\beta(t)_{est}$ may be derived by tracing the envelope amplitudes of the filtered $I(t)_{bandpass}$ and $Q(t)_{bandpass}$ signals as functions of time t. The envelope amplitudes may then be fit linearly to a cosine and sine function, such as V cos (at +b) or V sin (at +b), where V is the amplitude voltage. The phase difference $\beta(t)_{est}$ may then be estimated from the expression (at +b) at any given time t within a transmitted data packet.

Thus, the data stream D(t) relates to the original data stream d(t) according to the following Equation 7:

$$D(t) = I(t)_{bandpass} \cos(\beta(t)_{est}) + Q(t)_{bandpass} \sin(\beta(t)_{est})$$

By substituting the expressions for $I(t)_{bandpass}$ and $Q(t)_{bandpass}$ determined above, the foregoing becomes Equation 8 as follows:

$$D(t) = (d(t)/2)[\cos(\beta(t))\cos(\beta(t)_{est}) + \sin(\beta(t))\sin(\beta(t)_{est})]$$

When $\beta(t)_{est}$ is equal to $\beta(t)$, it should be appreciated that the recovered data stream $\beta(t)$ will be directly proportional to the original data stream $\beta(t)$. Accordingly, Equation 7 may be utilized to recover the data stream $\beta(t)$.

An example of a transponder signal through various stages of processing is shown in FIGS. 3A–3D. In FIG. 3A, a bipolar data stream d(t) is shown representing random ONE's and ZERO's sent by a moving transponder at a fixed rate of speed, where time t is measured in microseconds (μsec). FIGS. 3B and 3C show the received filtered $I(t)_{bandpass}$ and $Q(t)_{bandpass}$ signals, respectively. The filtered $I(t)_{bandpass}$ and $Q(t)_{bandpass}$ signals are essentially unreadable due to the amplitude nulls and phase reversals of the signals. FIG. 3D shows the recovered data stream D(t) derived using the foregoing method. It should be apparent that the recovered data stream D(t) is identical to the original data stream d(t) shown in FIG. 3A. It should be appreciated that the distortion of the filtered $I(t)_{bandpass}$ and $Q(t)_{bandpass}$ signals illustrated in FIGS. 3B and 3C corresponds to a transponder movement in excess of 10,000 cm/sec, or 300 miles per hour. At that speed, the transponder would only be in the field of reception of the interrogator for about 10 msec, which in practice would be an insufficient amount of time to read an entire data packet even if the original data stream d(t) were recovered as discussed above. Accordingly, the degree of distortion of these signals is exaggerated for the purpose of illustration to better show the advantages of the present invention.

For a transponder moving with a fixed velocity (v) with respect to the interrogator, the distance x(t) between the interrogator and transponder is equal to the product vt, where t is time (see Equation 3 above). This implies that the phase difference $\beta(t)$ is a linear function of time for a moving transponder, and hence, the $I(t)_{bandpass}$ and $Q(t)_{bandpass}$ signals are sine and cosine functions of time, as illustrated in FIGS. 3B and 3C, respectively. Ordinarily, the estimated phase difference $\beta(t)_{est}$ is expected to behave as a continuous function of time, and therefore can be evaluated and tracked once its first value is initialized properly. The estimated phase difference $\beta(t)_{est}$ generally locates initially in either the first or fourth quadrants of the phase plane depending on the relative signs of the $I(t)_{bandpass}$ and $Q(t)_{bandpass}$ signals. More particularly, if both of the $I(t)_{bandpass}$ and $Q(t)_{bandpass}$ signals have the same sign, then the estimated phase difference $\beta(t)_{est}$ is likely located initially in the first quadrant of the phase plane. Conversely, if the $I(t)_{bandpass}$ and $Q(t)_{bandpass}$ signals have opposite signs, then the estimated phase difference $\beta(t)_{est}$ is likely located initially in the fourth quadrant of the phase plane. The accuracy of the phase difference estimation within $2\pi$ in the phase plane can be verified by comparing the preamble pattern of the received information signal to a known pattern. Since the transponder is moving, it should be understood that the phase difference $\beta(t)$ will not remain constant, but will change over time as the data stream d(t) is received. Therefore, the quadrant selected initially for the estimated phase difference $\beta(t)_{est}$ should be reevaluated periodically to determine whether it has shifted to another quadrant.

It should also be appreciated that the linear relationship between distance x(t) and the phase difference $\beta(t)$ defined in Equation 3 above allows the accurate determination of the distance between the interrogator and transponder from the estimated phase difference $\beta(t)_{est}$. Moreover, the velocity of the transponder can also be derived from the first derivative of the distance dx/dt. Conversely, if the distance and/or velocity of the transponder were known in advance, then the phase difference $\beta(t)_{est}$ can be determined therefrom using Equation 3. Accurate predictions of future values of the phase difference $\beta(t)_{est}$ can thereby be generated by tracking repetitive movements of the transponder, such as from a work piece moving on a conveyor belt at a fixed speed or timing.

Referring now to FIG. 2, an embodiment of an RF/ID interrogator 10 is illustrated. The microcontroller module 20 further comprises a microcontroller 22, a dynamic random access memory (DRAM) 23, a flash memory 24, a programmable logic device (PLD), an Ethernet interface 27, and an RS-232 interface 26. The microcontroller 22 may be provided by a general-purpose microprocessor adapted to execute a series of instructions (i.e., software or firmware) at a relatively high clock rate, such as the Motorola 68360 series microcontroller. The PLD 25 provides a high-speed serial data interface between the microcontroller module 20 and the DSP module 30, and serves to control the timing and format of signals passing between the microcontroller module and the DSP module. The microcontroller module 20 handles the power-up initialization of the interrogator 10, host communications, RF/ID protocol, and error recovery.

The DRAM 23 is accessible by the microcontroller 22 through a parallel data connection and provides for volatile memory storage of data values generated during the execution of instructions by the microcontroller. The flash memory 24 is also accessible by the microcontroller 22 through a parallel data connection and provides non-volatile memory storage for the microcontroller 22. The flash memory 24 may contain program instructions utilized upon the initial start-up of the interrogator. The start-up program is uploaded from the flash memory 24 to the microcontroller 22, and copied to the DRAM 23 which provides a high speed memory access space for execution of the program. It should be appreciated that other types of commercially available, non-volatile memory may be used instead of flash memory, such as an electrically erasable, programmable read only memory (EEPROM), or optical or magnetic disk storage.

The ethernet interface 27 and RS-232 interface 26 provide for communications by the interrogator 10 with external systems. As known in the art, the ethernet interface 27 permits parallel data communication between the interrogator 10 and a wired or wireless local area network (LAN). The RS-232 interface 26 permits serial data communication between the interrogator 10 and peripheral devices, such as a printer, monitor, bar code scanner, or other such device.

The DSP module 30 includes a DSP 32, an EEPROM 34, a static random access memory (SRAM) 35, a PLD, a data converter 36, and an analog baseband filter 37. The DSP 32 may be provided by a special purpose microprocessor optimized to perform high-speed mathematical calculations, such as the Texas Instrument 320C50 series DSP. The DSP module 30 controls all tasks associated with the radio module 40, such as generation of error correction codes (e.g., Manchester code and cyclic redundancy check (CRC)), and determination of the frequency hopping rate and channel dwell time. The microcontroller module 20 provides control words over the serial data link to determine the specific operations controlled by the DSP module 30, such as transmitting or reading data. Data recovered from and transmitted to the transponder 15 is also passed between the microcontroller module 20 and the DSP module 30.

The PLD 33 provides an interface between the DSP 32 and the radio module 40, and controls operation of the EEPROM 34 and SRAM 35 memory devices. The SRAM 35 is accessible by the DSP 32 through a parallel data connection and provides for non-volatile memory storage of data values generated during the execution of instructions by the microcontroller. The EEPROM 34 is also accessible by the DSP 32 through a parallel data connection and provides non-volatile memory storage for the DSP module 30. It should be appreciated that other types of commercially available, memory devices may be used instead of the EEPROM 34 or SRAM 35.

The data converter 36 includes two analog-to-digital (A/D) converters and a digital-to-analog (D/A) converter. The A/D converters sample the analog I and Q signals received from the radio module 40 to provide a binary data stream to the PLD 33. The D/A converter convert a digital signal provided by the PLD 33 to an analog signal used to control the frequency of the local oscillator of the radio module 40 (described below). The analog baseband filter 37 provides bandpass filtering and amplification of the I and Q signals. The analog baseband filter 37 includes a low noise amplifier stage, high pass filter stages and low pass filter stages. The gain of the low noise amplifier stage is programmable by the DSP 32 through the PLD 33.

The PLD 33 provides decode logic for memory mapping the EEPROM 34 and SRAM 35 memory devices. The PLD 33 also has programmable timers for controlling the timing of sending and receiving of data between the DSP 32 and the radio module 40. A plurality of signals are transferred between the PLD 33 and the DSP 32 for sending control signals to the radio module 40 and to read/write data to the EEPROM 34 and SRAM 35 memory devices. Data is transmitted bi-directionally between the PLD 33 and the DSP 32. Address (ADD) information is provided by the DSP 32 to the PLD 33 to identify specific addresses of information within the EEPROM 34 and SRAM 35 memory devices to be accessed. The DSP 32 provides a read/write signal (R/W) to the PLD 33 to distinguish between a memory read and a memory write operation. Interrupts (INT) are provided by the PLD 33 to the DSP 32 to trigger execution of program steps in response to completion of timed events. Serial input/output (SIO) of data signals pass bi-directionally between the PLD 33 and the DSP 32. The PLD 33 provides control data (DI/DO) to the analog baseband filter 37 to control the bandpass filter parameters and program the gain of the amplifier stages.

The radio module 40 comprises a direct-conversion receiver and uses on-off keying (OOK) for downlink communication (i.e., from the interrogator 10 to the transponder 15). A local oscillator 41 generates an RF carrier (fc), such as may be provided by a voltage controlled amplifier (VCO). The local oscillator 41 is controlled signals provided by the DSP module 30 to provide the RF carrier at predefined frequencies (e.g., around 2.4 GHz) for predefined dwell periods (e.g., 0.4 seconds) in accordance with a predetermined hopping sequence. In a preferred embodiment of the present invention, the hopping sequence is defined by the IEEE Wireless LAN draft standard 802.11.

On the transmit side, the radio module 40 includes a mixer 42, pre-amplifier stages 43, 44, and the hybrid 50. To transmit data from the interrogator 10 to the transponder 15, analog data signals are provided from the DSP module 30 to the mixer 42. The mixer 42 mixes the analog data signals with the RF carrier provided by the local oscillator 41 to provide a modulated carrier signal. To receive backscattered data from the transponder 15, the radio module 40 transmits the RF carrier alone (without any analog data signals) at full power. The pre-amplifier stages 43, 44 raise the power of the transmitted signal (with or without modulated analog data signals) from the mixer 42 to a desired power level for broadcast as an RF signal. The hybrid 50 couples the transmitted signal to an antenna in the manner described above with respect to FIG. 1.

In an embodiment of the invention, the radio module 40 includes a pair of antennas 48, 49, having respective low pass filters 46, 47 as shown in FIG. 2. Each one of the antennas 48, 49 are coupled to the hybrid 50 through a transmit/receive (T/R) switch 45. The antennas 48, 49 may be adapted to transmit linearly polarized radiation in directions oriented orthogonal to each other, so that particular transponders can communicate with the interrogator 10 on the basis of their orientation. The DSP module 30 controls the T/R switch 45 to select which one of the antennas 48, 49 is to be used. An example of a method for selecting groups of RF transponders using plural polarized antennas is disclosed in U.S. Pat. No. 5,777,561, for METHOD OF GROUPING RF TRANSPONDERS, which is assigned to the present assignee, the subject matter of which is incorporated herein by reference.

On the receive side, the radio module 40 comprises a mixer 51 coupled to the hybrid 50, an I channel RLC circuit 54 and amplifier stage 56, and a Q channel RLC circuit 53 and amplifier stage 55. The RF carrier provided by the local oscillator 41 through the mixer 42 passes through an amplifier stage 52 to the mixer 51. Backscattered signals received through one of the antennas 48, 49 pass through the hybrid 50 to the mixer 51. By mixing the received signals with the RF carrier, the received signals are directly downconverted to baseband I and Q signals. The I and Q signals are thereafter provided to the analog baseband filter 37 of the DSP module 30 as substantially described above.

The DSP module 30 combines the I and Q signals in accordance with the equations set forth above to recover the data signal D(t) received from the transponder 15. A flow chart illustrating execution of an exemplary program by the DSP 32 to combine the I and Q signals is shown in FIG. 4. The program starts at step 400 in response to the beginning of a data receiving operation. At step 401, an initial quadrant for the phase angle β(t) is selected. As discussed above, the phase angle β(t) may initially lie in either the first or fourth quadrant in the phase plane. If both the $I(t)_{bandpass}$ and the $Q(t)_{bandpass}$ signals have the same sign, then the first quadrant is selected; conversely, if the signals have opposite signs, then the fourth quadrant is selected. As will be further described below, this initial selection will be corrected later if it is determined to be inaccurate after data is decoded, and will be periodically checked to ensure that it is still accurate. After the quadrant for the initial phase angle β(t) is selected (i.e., first or fourth), a loop begins in which the data signal D(t) is decoded from the I(t) and Q(t) signals. At step 402, the estimated phase angle $β(t)_{est}$ is determined. As described above, the estimated phase angle $β(t)_{est}$ may be calculated from the arctangent of the ratio of the bandpass filtered Q(t) and I(t) signals, in accordance with Equation 6. The estimated phase angle $β(t)_{est}$ may also be derived using any of the alternative methods discussed above, or may be known in advance or estimated from historical data. At step 403, the initial quadrant selected for the estimated phase angle $β(t)_{est}$ is rechecked to verify that it is still accurate. In the first pass through this portion of the program look, this step may be omitted. This step 403 will be discussed in greater detail below in conjunction with subsequent passes through the program loop.

At step 404, the recovered data signal D(t) is calculated using the estimated phase angle $\beta(t)_{est}$, in accordance with Equation 7. The recovered data signal D(t) is then decoded at step 405 to recover the binary information encoded therein. In an embodiment of the invention, a data coding scheme referred to as FMO is utilized for communication of data signals from the transponder 15 to the interrogator 10. According to the FMO coding scheme, the ONE bit has transitions at the beginning and end of the bit, and the ZERO bit has an additional transition in the middle of the bit compared to the ONE bit. Since the ZERO bit has twice the frequency component of the ONE bit, the recovered data is independent of phase. The FMO scheme is therefore an advantageous method for coding data for on-off keying systems; however, it should be appreciated that alternative data coding schemes may also be utilized.

At step 406, the program checks whether the synch flag has been set. In the first pass through this portion of the loop, the synch flag will not yet have been set. As will be further described below, the synch flag will be set later when synchronization with the received signal is verified. Continuing through the first pass through the loop, at step 408, the recovered data signal D(t) is compared against a known preamble pattern. Data transmitted from the transponder 15 generally includes a preamble portion consisting of a sequence of data bits (e.g., 52 bits) arranged in a predefined pattern. The purpose of the preamble portion is to enable the interrogator 10 to synchronize to the signal received from the transponder 15. The information stored in the transponder 15 follows after the preamble portion. The preamble portion is used in the present invention to determine the accuracy of the selection of the quadrant of the initial phase angle β(t) at step 401, as will be further described below.

At step 409, it is determined whether there exists a match between the data signal D(t) and the predefined preamble. If the data signal D(t) matches the predefined preamble, the synch flag is set at step 410, and the program loops back to step 402 to continue recovering data from the received signal. A match between the recovered data signal D(t) and the predefined preamble means that the initial selection of the phase angle β(t) at step 401 was correct. If the data signal D(t) does not match the predefined preamble, the program proceeds to step 411, where the recovered data signal D(t) is compared with the ones complement of the predefined preamble. If the recovered data signal D(t) matches the ones complement of the predefined preamble, then the selected quadrant is determined to be incorrect and is changed at step 412 (i.e., first to third, or fourth to second). Alternatively, rather than changing the selected quadrant, the program may invert the polarity of the recovered data signal D(t). Then, as above, the synch flag is set at step 410 and the program loops back to step 402 to continue recovering data from the received signal with the changed quadrant.

If no match is found between the recovered data signal D(t) and either the predefined preamble or the ones complement of the predefined preamble, then the recovered data signal D(t) does not correspond to valid data and may constitute an interfering signal such as noise. Then, at step 413, it is determined whether a predefined time period during which a data signal was expected to be received from the transponder 15 has elapsed, i.e., whether the system has "timed out." If the time period has elapsed, the system has "timed out" and the program ends at step 414. Alternatively, if the time period has not yet elapsed, the program loops back to step 402.

Returning to step 406, in subsequent passes through the program loop after detecting a match between the recovered data signal D(t) and either the predefined preamble or the ones complement of the predefined preamble, the synch flag is set. Thereafter, at step 407, the program checks whether the end of a data packet has been reached, and if so, the program ends at step 414. The end of the data packet may be detected by certain unique data characters disposed at the end of the data packet, such as the CRC code. If the end of the data packet has not yet been reached, the program loops back to step 402, and the program continues to decode the recovered data signal D(t) in the manner described above until the end of the data packet is reached.

As discussed above, in subsequent passes through the program loop after the synch flag has been set at step 410, it is necessary to periodically verify the continued accuracy of the initial quadrant selected at step 401 or corrected at step 412. The periodic verification is performed at step 403 in which the estimated phase angle β(t) is evaluated as a continuous function of time. For example, in successive passes through the program loop the estimated phase angle β(t) may change in incremental amounts, e.g., 62° to 66° to 71°, etc. The direction of change of the estimated phase angle β(t) (i.e., increasing or decreasing) depends upon the direction of movement of the transponder 15 relative to the interrogator 10. When the estimated phase angle β(t) increases past 90°, the quadrant changes from first to second. Similarly, when the estimated phase angle β(t) increases past 180°, the quadrant changes from second to third, and so forth. In step 403, a history is maintained of successive values of the estimated phase angle β(t), and the quadrant is modified if it is recognized that the estimated phase angle β(t) has transitioned past a quadrant boundary.

Having thus described a preferred embodiment of an RF/ID interrogator signal processing system for reading fast moving transponders, it should be apparent to those skilled in the art that certain advantages of the aforementioned system have been achieved. It should also be appreciated that various modifications, adaptations, and alternative embodiments thereof may be made within the scope and spirit of the present invention. The invention is further defined by the following claims.

What is claimed is:

1. A method for recovering a backscattered data signal from a radio frequency (RF) transponder comprising the steps of:

receiving in-phase (I) and quadrature-phase (Q) signals from said RF transponder, said I and Q signals containing said backscattered data signal directly modulated onto an RF carrier wherein a phase angle P(t) between the I and Q signals and said RF carrier is substantially unknown;

estimating said phase angle β(t) between the I and Q signals and said RF carrier; and recovering said backscattered data signal by combining said I and Q signals with said estimated phase angle β(t).

2. The method of claim 1, wherein said recovering step further comprises summing a product of said I signal and the cosine of said estimated phase angle β(t) with a product of said Q signal and the sine of said estimated phase angle β(t).

3. The method of claim 1, further comprising the step of filtering said I and Q signals to remove direct current (DC) components therefrom.

4. The method of claim 1, further comprising the step of selecting one of first and fourth quadrants of a phase plane for an initial quadrant of said estimated phase angle β(t) by comparing relative signs of said I and Q signals.

5. The method of claim 4, further comprising the step of periodically verifying continued accuracy of said selected initial quadrant of said estimated phase angle β(t) by comparing a current value of said estimated phase angle β(t) to previous values of said estimated phase angle β(t).

6. The method of claim 4, wherein said first quadrant is selected when said I and Q signals have common signs.

7. The method of claim 4, wherein said fourth quadrant is selected when said I and Q signals have opposite signs.

8. The method of claim 4, further comprising the step of comparing said recovered backscattered data signal with a predefined data sequence.

9. The method of claim 8, wherein said selected one of said first and fourth quadrants is accurate if said backscattered data signal matches said predefined data sequence.

10. The method of claim 9, further comprising the step of repeating said recovering step using said selected one of said first and fourth quadrants until an end of said backscattered data signal is reached.

11. The method of claim 8, further comprising the step of comparing said recovered backscattered data signal with a ones complement of said predefined data sequence if said backscattered data signal fails to match said predefined data sequence.

12. The method of claim 11, further comprising the step of selecting one of third and second quadrants if said backscattered data signal matches said ones complement of said predefined data sequence.

13. The method of claim 12, further comprising the step of repeating said recovering step using said selected one of said third and second quadrants until an end of said backscattered data signal is reached.

14. The method of claim 1, wherein said estimating step further comprises calculating an arctangent of a ratio of said Q and I signals.

15. The method of claim 3, wherein said filtering step further comprises passing said I and Q signals through a bandpass filter.

16. An apparatus for recovering a backscattered data signal from a radio frequency (RF) transponder, comprising:
a radio having a transmitter portion to provide an RF carrier signal and a receiver portion to receive in-phase (I) and quadrature-phase (Q) signals from said RF transponder, said I and Q signals containing said backscattered data signal directly modulated onto an RF carrier wherein a phase angle β(t) between the I and Q signals and said RF carrier is substantially unknown;
a bandpass filter coupled to said radio to remove direct current (DC) components from said I and Q signals;
a processor coupled to said radio and said bandpass filter, said processor further having a memory containing stored instructions to be executed by said processor, said stored instructions comprising:
estimating said phase angle β(t) between the I and Q signals and said RF carrier; and
recovering said backscattered data signal by combining said filtered I and Q signals with said estimated phase angle β(t).

17. The apparatus of claim 16, wherein said recovering instruction further comprises summing a product of the filtered I signal and the cosine of said estimated phase angle β(t) with a product of the filtered Q signal and the sine of said estimated phase angle β(t).

18. The apparatus of claim 16, wherein said stored instructions further comprise selecting one of first and fourth quadrants of a phase plane for said estimated phase angle β(t) based on a comparison of relative signs of said filtered I and Q signals.

19. The apparatus of claim 18, wherein said stored instructions further comprise comparing said recovered backscattered data signal with a predefined data sequence.

20. The apparatus of claim 19, wherein said selected one of said first and fourth quadrants is accurate if said backscattered data signal matches said predefined data sequence.

21. The apparatus of claim 20, further comprising the instruction of repeating said recovering instruction using said selected one of said first and fourth quadrants until an end of said backscattered data signal is reached.

22. The apparatus of claim 19, further comprising the instruction of comparing said recovered backscattered data signal with a ones complement of said predefined data sequence if said backscattered data signal fails to match said predefined data sequence.

23. The apparatus of claim 22, further comprising the instruction of selecting one of third and second quadrants if said backscattered data signal matches said ones complement of said predefined data sequence.

24. The apparatus of claim 23, further comprising the instruction of repeating said recovering instruction using said selected one of said third and second quadrants until an end of said backscattered data signal is reached.

25. The apparatus of claim 16, wherein said estimating instruction further comprises calculating an arctangent of a ratio of said filtered Q and I signals.

* * * * *